Patented Feb. 15, 1938

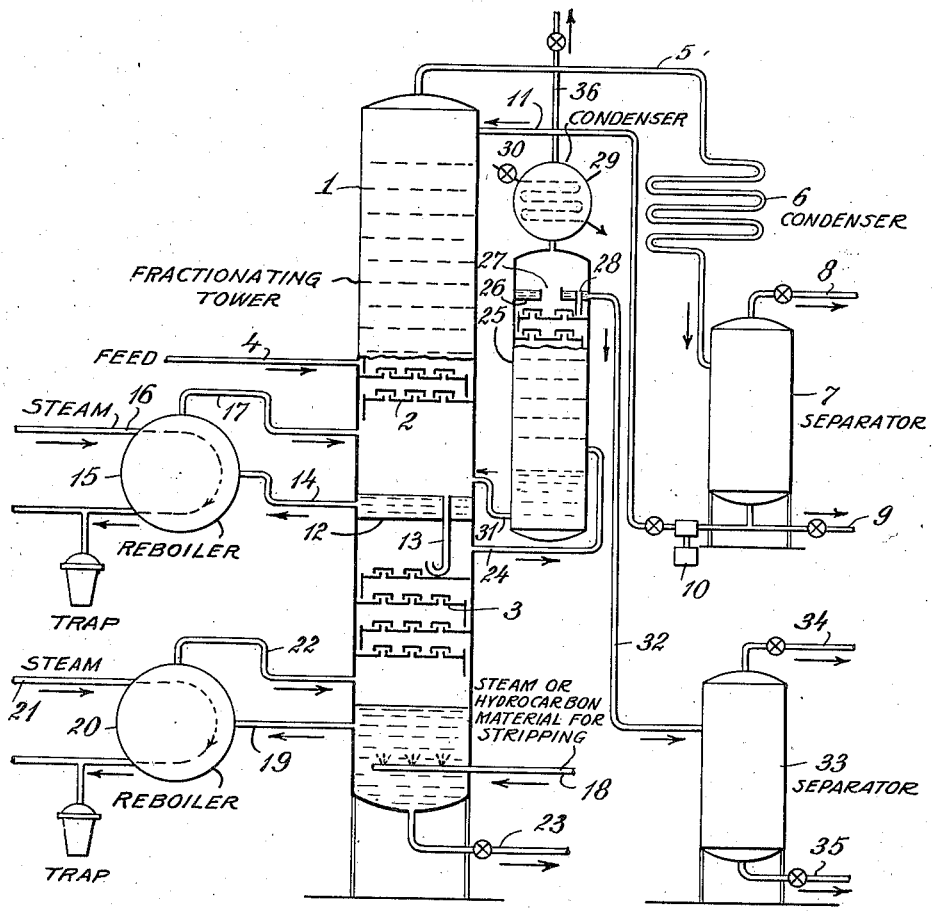

2,108,659

UNITED STATES PATENT OFFICE 2,108,659

METHOD AND APPARATUS FOR DISTILLATION

George S. Dunham, Augusta, Kans., assignor to Socony-Vacuum Oil Company, Incorporated, New York, N. Y., a corporation of New York Application August 17, 1935, Serial No. 36,626

2 Claims. (Cl. 196—72)

This invention relates to distillation and fractionation, and is specifically concerned with methods of distillation wherein a heated feed, either in the form of vapor or a mixture of vapor and liquid, is fed to a point in a fractionating column intermediate its ends, the lighter portions of the feed being rectified in the portion of the tower or column above the feed inlet location, and the heavier portions of the feed being stripped in the portion of the tower or column below the feed inlet.

This method of distillation is quite widely practiced on a multitude of materials. In the usual case, the fractionation equipment used is a bubble plate tower, and the discussion herein will be directed to such a tower, although packed towers, baffle plate towers, perforated plate towers, and stage spray contact towers are all similar in characteristics and are held to be within the purview of this invention. In the usual case, the control of the rectification of vapors in the portion of the tower above the feed inlet is by condensation and return of a portion of the condensed overhead vapors from the tower to the top of the tower as wet reflux. Other methods, such as a total condensation and withdrawal of a portion of condensate as product, partial condensation and the like, are also contemplated. The stripping of the liquid in the portion of the tower below the feed inlet is usually accomplished either by the addition of heat to the tower bottom by a reboiler or the like, or more commonly by the introduction of a gaseous medium, either inert or related to the distilled material, for its partial pressure effect. Both methods of stripping are herein contemplated. In the exemplary discussion presented herein, the materials treated are hydrocarbons. The conditions of the treatment are general in nature, and the use of hydrocarbons is exemplary only and not intended to be limiting.

In the operation of fractionation pointed out, as practiced in the usual manner, sacrifices in efficiency are taken because the usual method links together two operations quite different in requirements, and each must sacrifice something to enable its combination with the other. In the rectification section above the feed plate, the most complete fractionation is obtained when the ratio of liquid passing down the tower is relatively great in proportion to the vapor going up. In the stripping section below the feed plate, the most complete stripping is obtained when the ratio of vapor going up the tower is relatively great in proportion to the liquid going down the tower. In customary practice, it is not possible to attain these conditions, since the liquid passing down the tower above the feed plate is roughly equal in amount to the reflux the feed plate by the addition of the unvaporized liquid from the feed, while the vapors going up the stripping section are those stripped from the liquid, which are relatively small in amount, plus the inert stripping medium, if any is used, and at the feed plate these are increased by the addition of the vaporous portions of the feed. Thus it may be seen that the conditions at the feed plate result in adding to each section of the composite tower a portion of ingredient which serves to alter the desired liquid to vapor ratios in a direction away from most efficient operation, and the operation of the composite tower is in effect a compromise between the two functions.

In many cases in the usual practice, it is customary to use steam or other inert medium in the gaseous form as a stripping agent in the stripping section. It is frequently undesirable to condense this medium with the overhead product from the fractionating tower, and in other cases, something which would otherwise be a very desirable stripping medium has a boiling point higher than the temperature of the tower top and is not used because it would derange the operation of the fractionating section, or require withdrawal therefrom as a side stream.

It is an object of this invention to provide a method of distillation wherein the combined steps of rectification and stripping can be so carried out that the liquid to vapor ratio in the rectification and stripping sections, may be adjusted independently in such a manner as to secure desirable conditions of operation in each. A further operation is the provision of a method of distillation wherein the operations of rectification and stripping may be carried out simultaneously on portions of a single feed stock without either step being influenced by the conditions imposed upon the other. Another object is the provision of such a process wherein a vaporous material may be used for the stripping operation, and its introduction to the rectification operation, (which it might derange), may be prevented. A further important object is the provision of apparatus for carrying out this desirable process.

In order that this invention may be completely understood, reference is now made to the drawing attached to and forming a part of this specification. The single figure of this drawing shows in somewhat diagrammatic form an apparatus, wherein this invention may be practiced. In the drawing, 1 represents a fractionating tower, composed of rectification section 2 and stripping section 3, fed with material heated to a temperature at which it is partially vaporous and introduced through pipe 4. Overhead vapors from the tower are removed through pipe 5, condensed in 6, and